United States Patent [19]

Kobayashi et al.

[11] 4,370,579
[45] Jan. 25, 1983

[54] POWER TOOL HAVING A PRINTED CIRCUIT BOARD

[75] Inventors: Jyuro Kobayashi; Masanori Ito; Hiroyasu Ishikawa, all of Katsuta, Japan

[73] Assignee: Hitachi Koki Company, Limited, Tokyo, Japan

[21] Appl. No.: 305,778

[22] Filed: Sep. 25, 1981

[30] Foreign Application Priority Data

Sep. 26, 1980 [JP] Japan .................................. 55-134778

[51] Int. Cl.$^3$ ........................... H02K 5/14; H02K 7/14
[52] U.S. Cl. ....................................... 310/50; 310/71; 310/239
[58] Field of Search .................. 310/50, 68 A, 71, 239, 310/249

[56] References Cited
U.S. PATENT DOCUMENTS

| | | | |
|---|---|---|---|
| 4,090,098 | 5/1978 | Kranzler et al. | 310/50 X |
| 4,293,789 | 10/1981 | King | 310/71 X |
| 4,348,603 | 9/1982 | Huber | 310/50 |

Primary Examiner—John Gonzales
Attorney, Agent, or Firm—Lowe, King, Price & Becker

[57] ABSTRACT

A power tool comprising a brush holder assembly formed of a plastic material, a printed circuit board and a positioning member for positioning the terminals of a switch and a power cable in contact with the printed circuit board. The brush holder assembly includes a pair of spaced apart arm portions each carrying a brush for making contact with the commutator and a web portion. In each of the arm portions of the assembly is embedded a pair of conductors each having a terminal at one end thereof for making electrical contact with a corresponding terminal of the stator, the other end of each conductor making contact with the printed circuit board. The printed circuit board is provided with a conductive pattern which permits the terminals of the switch and power cable to be mutually connected and further permits them to be connected to the conductors of the brush holder assembly to complete a series circuit.

6 Claims, 11 Drawing Figures

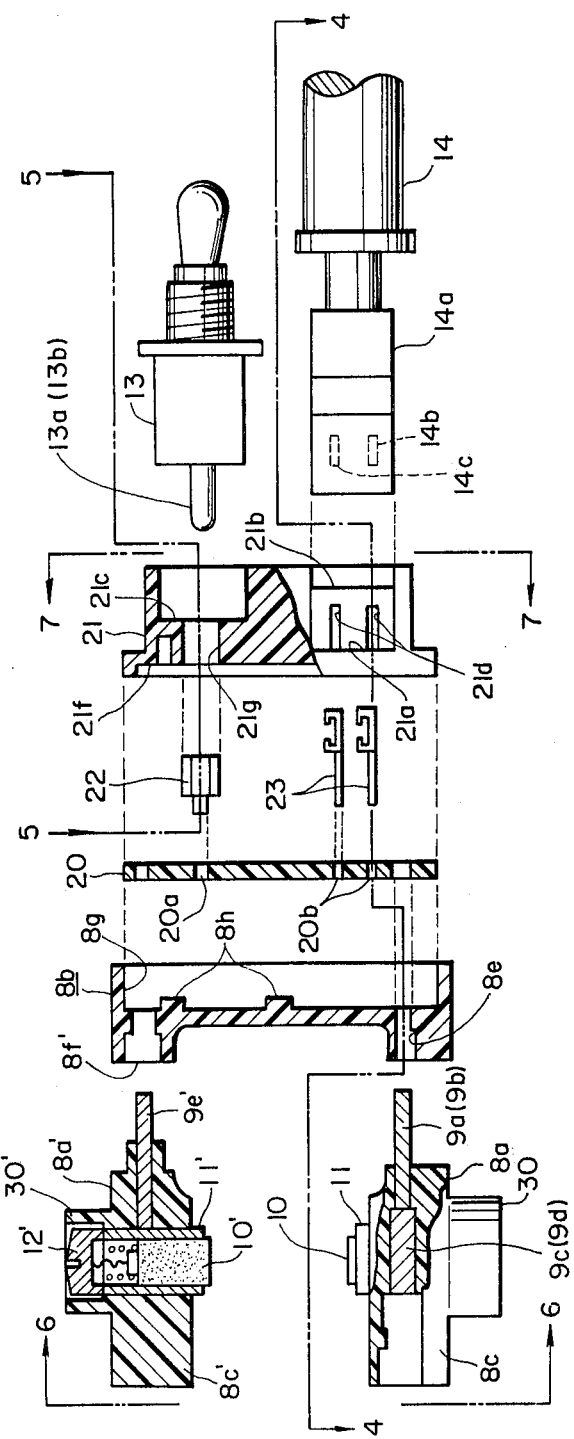

POWER TOOL HAVING A PRINTED CIRCUIT BOARD

BACKGROUND OF THE INVENTION

The present invention relates generally to power tools, and in particular to an improvement to the driving part of the power tool which permits the power tool to be automatically assembled.

The component parts of conventional power tools are assembled together by interconnecting them with the use of wires. The wires must be connected to terminals by soldering or other fastening means such as screws and press-fit. This, however, not only constitutes an obstacle to the automation of production process but gives rise to potential sources of troubles such as insulation failures.

SUMMARY OF THE INVENTION

Accordingly, the present invention provides a power tool which allows automatic assemblage of its components by the use of a plurality of insulative blocks having terminations and an electrical circuit board provided between adjacent blocks to permit interconnection between the various components of the power tool.

The power tool of the invention includes, within a housing, a stator including a pair of stator coils and a plurality of stator terminals connected to the stator coils, a rotor having a commutator rotatably mounted with respect to the stator, a switch having a pair of terminals and a power cable end block having a pair of terminals. The power tool comprises, a brush holder assembly including pair of transversely spaced apart, axially extending parallel blocks of insulative material each holding a brush and a pair of conductors extending parallel therethrough. Each of the conductors includes a terminal at one end thereof for connection with an associated one of the stator terminals, the parallel blocks being connected together by a web member so that each brush is brought into contact with the commutator. The electrical circuit board is located adjacent to the web member of the brush holder assembly remote from the stator. The power tool further includes a positioning member of insulative material adjacent to the printed circuit board remote from the brush holder assembly for positioning the terminals of the switch and cable end block in contact with the electrical circuit board. The electrical circuit board is provided with circuit a pattern which permits the terminals of the switch and cable end block to be mutually connected and further permits them to be electrically connected to the conductors of the brush holder assembly so that the stator coils, commutator, brushes and switch are connected in a series circuit with the terminals of the cable end block.

BRIEF DESCRIPTION OF THE DRAWINGS

The invention will be further described by way of example with reference to the accompanying drawings, in which:

FIG. 3 is an exploded, cross-sectional view of the components of the power tool;

DETAILED DESCRIPTION

Figure 1:
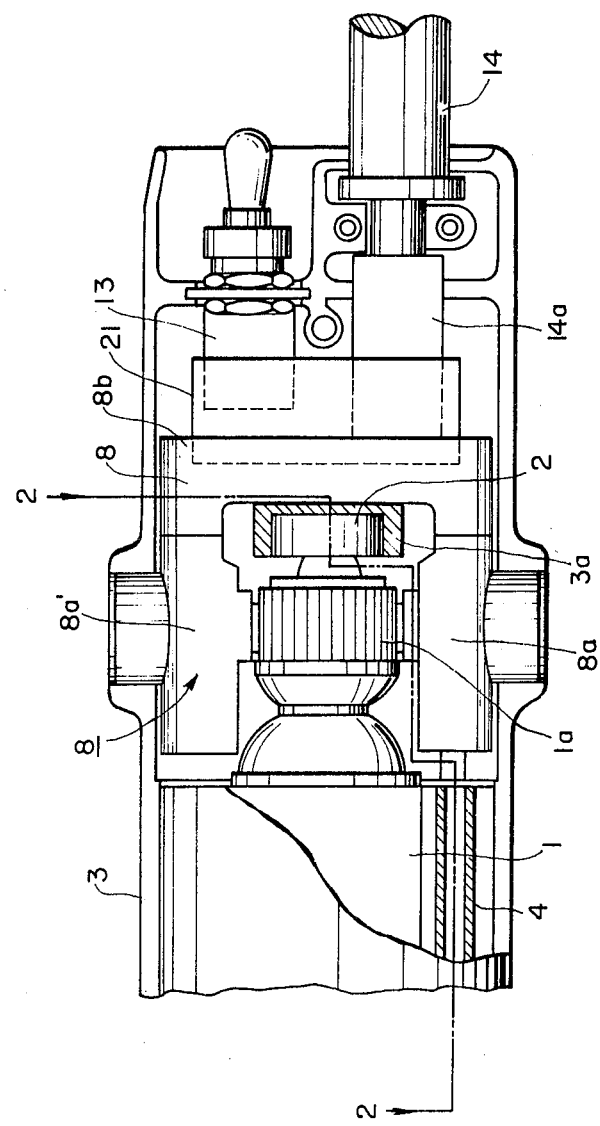
FIG. 1 is a partially cross-sectioned diagram of a portion of a power tool of the invention with a half section of the tool housing being removed.
Figure 2:
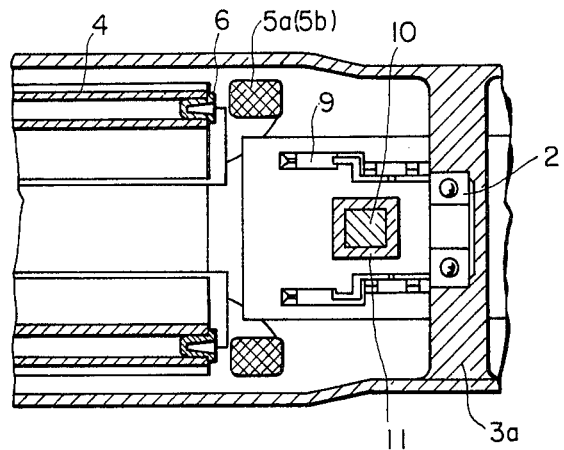
FIG. 2 is a cross-sectional view taken along the lines 2—2 of FIG. 1.
Figure 6:
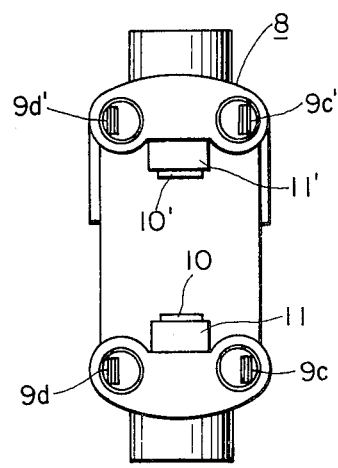
FIG. 6 is an end view taken along the lines 6—6 of FIG. 3.

In FIGS. 1 to 10 of the drawings a portion of an electrically driven power tool embodying the invention is illustrated as comprising within a tool housing 3 a stator 4 mounted on the left or forward end portion of the tool and a rotor 1. The housing 3 is of a structure which is divided into two identical parts in the axial direction thereof. In FIG. 1 the tool is shown with one half section of the housing 3 is removed to make the inside visible. The rotor 1 is provided with a commutator 1a rotatably mounted on a bearing 2 secured in a cross member 3a (FIG. 2) of the housing 3. In the rear end portion of the tool is provided a power cable 14 having a pair of insulated wires which are connected respectively to elongated flat terminals 14b and 14c extending in the transverse direction of the tool from a moulded plastic body or terminal block 14a. A switch 13 having a pair of elongated flat terminals 13a and 13b is mounted above the terminal block 14a.

Figure 4:
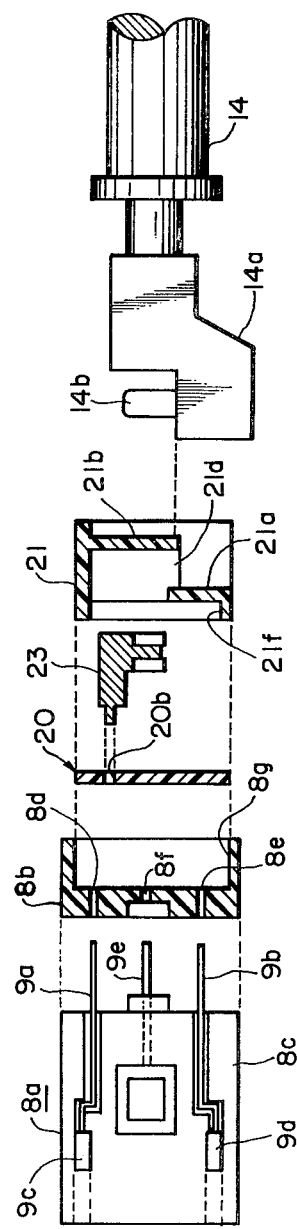
FIG. 4 is a cross-sectional view taken along the lines 4—4 of FIG. 3.
Figure 8:
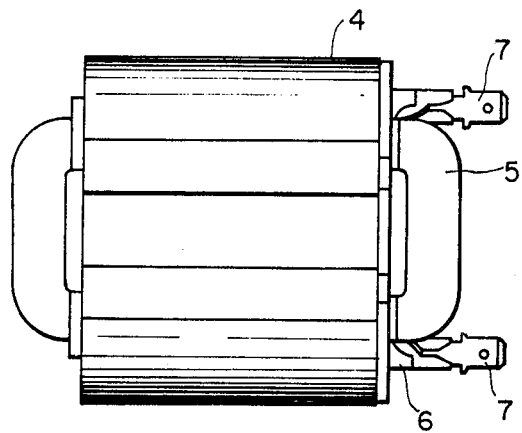
FIG. 8 is a side view of the stator structure of FIG. 1.

According to the invention, the power tool includes an inverted, generally C-shaped brush holder assembly 8 comprising a pair of identically constructed, opposedly facing axially exending brush holding arms 8a and 8a' which are connected together by a coupling member 8b which forms the web portion of the inverted C-shaped structure 8. As shown in FIGS. 3 and 4, each brush holding arm comprises a pair of conductors 9a and 9b respectively provided with female terminals 9c and 9d (9c' and 9d', see also FIG. 6) secured in grooves formed in a moulded plastic body 8c for electrical connection with male terminals 7a and 7b (7a' and 7b') which are illustrated in FIGS. 8 and 9.

Figure 9:
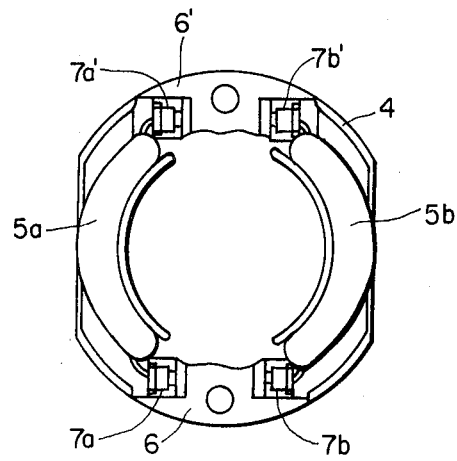
FIG. 9 is an end view of the stator structure of FIG. 8.

The stator 4 includes a pair of stator coils 5 and a pair of insulative terminal supports 6 and 6' each located between the stator coils 5a and 5b as shown in FIG. 9. The terminals 7a, 7b and 7a', 7b' are supported in pairs by the terminal supports 6 and 6', respectively, and connected to the stator coils 5a and 5b so that the terminals 7a and 7a' are connected to the opposite ends of the coil 5a and the terminals 7b and 7b' are connected to the opposite ends of the coil 5b.

A hollow conductive member 11 (11') of a rectangular cross-section is embedded in the moulded body 8a (8b') for securing therein a brush 10 (10') so that the brushes 10 and 10' are located in diametrically opposite positions for making contact with the commutator 1a, each brush being adjustable in radial direction by means of a screw 12 (12') secured in a screw holder cap 30 (30'). A conductor 9e (9e') is partially embedded in the body 8c for electrically coupling the brush 10 (10'). The conductors 9a, 9b and 9e (9a', 9b' and 9e') extend rearward for connection to other elements of the tool as will be described. The web portion 8b of the brush holder assembly 8 is also moulded from a plastic material and provided with a pair of side openings 8d and 8e and a center opening 8f to permit the conductors 9a, 9b and 9e to extend therethrough, respectively. A set of similar openings 8d', 8e' and 8f' (only opening 8f is shown) is also provided to allow the conductors 9a', 9b' and 9e' to extend therethrough. The web portion 8b is further provided with a rearwardly offset recess 8g to accommodate therein a printed circuit board 20. The circuit board 20 is perforated so as to allow the tip ends of the various conductors or terminals to be accurately located in desired positions of a conductive film pattern formed thereon for connection to associated elements of the tool in a manner as will be described later.

Figure 7:
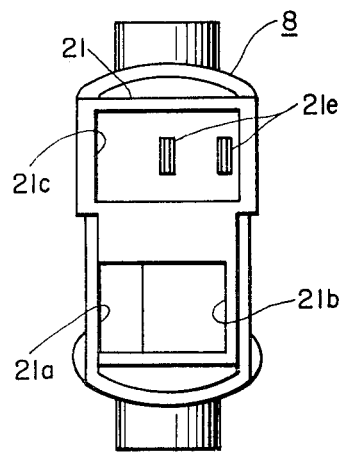
FIG. 7 is an end view taken along the lines 7—7 of FIG. 3.
Figure 10:
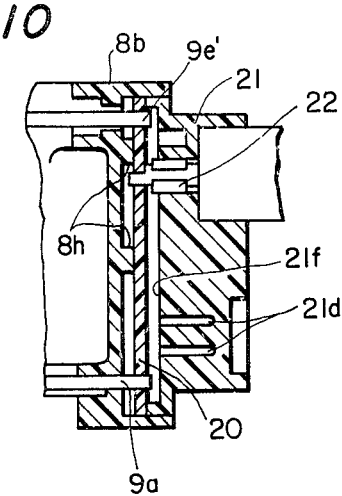
FIG. 10 is a cross-sectional view of a portion of the power tool of FIG. 1 when the components are assembled illustrating the detail of the printed circuit board and the adjacent components.

In the recess 8g of the brush holder assembly 8 is partially accommodated a coupling and positioning member 21 which is formed with axially stepped recesses 21a and 21b for engaging the terminal block 14a of the cable 14 and another recess 21c to engage the switch 13 (see FIG. 7). Between the stepped recesses 21a and 21b is formed a pair of rectangular openings 21d as seen in FIG. 3 which extend transverse to the axial direction of the tool to receive therein the elongated flat terminals 14b and 14c of the power cable 14 and are open toward the brush holder assembly 8. The transversely extening openings 21d serve to prevent the power cable 14 from being detached from the power tool when the cable 14 is pulled axially by an excessive amount of force. The web portion 8b of the brush holder assembly 8 and coupling member 21 are respectively formed with lugs 8h and a recess 21f so that when the printed-circuit board 20 is sandwiched between them there is a space on each side of the board 20 to permit the conductors or terminals to extend partially into the opposite side as shown in FIG. 10.

Figure 5:
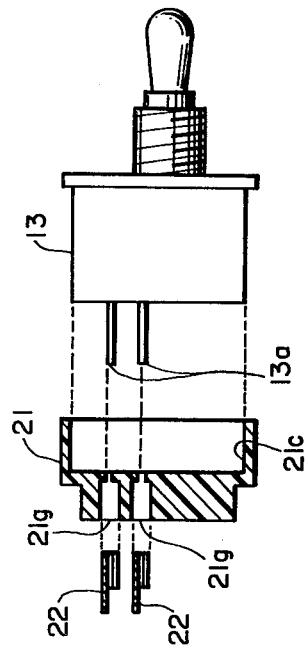
FIG. 5 is a cross-sectional view taken along the lines 5—5 of FIG. 3.

To achieve electrical connection between the various elements of the power tool, connecting elements 22 and 23 are provided in pairs (see FIGS. 3, 4 and 5). The connecting elements 22 each include a coupling part which is shaped to snugly engage with each of the elongated flat terminals 13a and 13b of the switch 13 through an opening 21g of the coupling member 21 and a narrow width tip portion which is received in a guide opening 20a of the printed circuit board 20. The connecting elements 23 are each in the L-shaped configuration as seen in FIG. 4 and similarly include a connecting part which engages with each of the elongated flat terminals 14b of the power cable 14 and a narrow tip end to be received in an opening 20b of the printed-circuit board 20.

Before assembling all the elements of the power tool the brush holder assembly 8 is first assembled by coupling the arm portions 8a and 8a' to the web portion 8b. Subsequently, the printed-circuit board 20 is inserted into the recess 8g of the assembly 8 followed by the coupling member 21 being partially inserted into the recess 8g with the connecting elements 22 and 23 being secured in position. The brush holder assembly 8 has its female terminal ends 9c, 9d, 9c' and 9d' being coupled to the male terminals 7a, 7b, 7a' and 7b', respectively, with the rotor 1 and commutator 1a being located in the stator 1 and between the brushes 10, 10' respectively. Therefore, all the tool components except for the switch 13 and power cable 14 are assembled together as a one-piece unit which is subsequently placed into one of the half section of the housing 3 by engaging the screw holding caps 30 and 30' firmly into complementarily recessed portions of the housing 3 as illustrated in FIG. 1. The switch 13 is subsequently inserted in the axial direction of the housing into the recess 21c of the coupling member 21 so that the terminals 13a are coupled with the connecting elements 22 and thence to the printed circuit board 20 and the connector block 14a of the cable 14 is inserted in the transverse direction so that the terminals 14b are coupled with the connecting elements 23 and similarly connected to the printed-circuit board.

Figure 11:
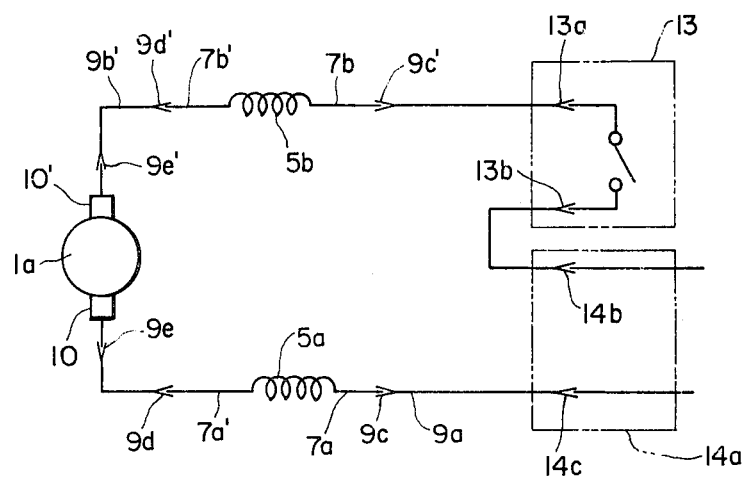
FIG. 11 is a circuit diagram of the power tool of FIG. 1.

FIG. 11 is an illustration of a circuit diagram of the printed-circuit board 20. The printed circuit pattern of the board 20 permits connection between the terminals 13b and 14b of the switch 13 and cable 14 and connection between the terminal 14c of the latter and the conductor 9a. Likewise, the terminal 13a of the switch 13 is connected to the conductor 9a'. The conductors 9e and 9e' are connected respectively to the female terminals 9d and 9d', respectively. By closing the switch 13 a series circuit will be completed which includes terminal 13a, conductor 9a', terminals 9c', 7b, stator coil 5b, terminals 7b', 9d', conductors 9b', 9e', brush 10', commutator 1, brush 10, conductors 9b, 9e, terminals 9d, 7a', stator coil 5a, terminals 7a, 9c, conductor 9a, terminal 14c, a power source (not shown), terminal 14b and terminal 13b.

What is claimed is:

1. A power tool having, within a housing, a stator including a pair of stator coils and a plurality of stator terminals connected to said stator coils, a rotor having a commutator rotatably mounted with respect to the stator, a switch having a pair of terminals and a power cable end block having a pair of terminals, comprising within said housing:
   a brush holder assembly including pair of transversely spaced apart, axially extending parallel blocks of insulative material each holding a brush and a pair of conductors extending parallel therethrough, each of said conductors including a terminal at one end thereof for connection with an associated one of said stator terminals, said parallel blocks being connected together by a web member so that each brush is brought into contact with said commutator,
   an electrical circuit board located adjacent to the web member of said brush holder assembly remote from said stator; and
   a positioning member of insulative material adjacent to said printed circuit board remote from said brush holder assembly for positioning the terminals of said switch and power cable end block in contact with said printed circuit board;
   said electrical circuit board including a circuit pattern which permits the terminals of said switch and power cable end block to be mutually connected and further electrically connected to the conductors of said brush holder assembly so that said stator coils; commutator, brushes and switch are connected in a series circuit with said power terminals.

2. A power tool as claimed in claim 1, wherein said electrical circuit board is a printed circuit board.

3. A power tool as claimed in claim 1 or 2, wherein said electrical circuit board is perforated with a plurality of guide openings to receive the conductors of said brush holder assembly and the terminals of said switch and power cable end block.

4. A power tool as claimed in claim 1 or 2, further comprising a plurality of connecting elements for electrically connecting the terminals of said cable end block to said electrical circuit board.

5. A power tool as claimed in claim 1, wherein said brush holder assembly is formed with a pair of transversely outwardly projecting portions in each of which is provided an adjustment screw of said brush, said housing being formed with a pair of recesses shaped complementarily to said projecting portions so that the same is secured firmly in position in said recesses.

6. A power tool as claimed in claim 1, wherein the terminals of said power cable end block extend in a transverse direction of the tool and said positioning member is formed with a transversely extending openings for receiving the terminals of said cable end block.

* * * * *